United States Patent [19]

Kuroki et al.

[11] Patent Number: 4,600,215
[45] Date of Patent: Jul. 15, 1986

[54] VEHICULAR SUSPENSION CONTROL SYSTEM WITH VARIABLE DAMPING CHARACTERISTICS DEPENDING UPON ROAD CONDITION AND VEHICLE SPEED

[75] Inventors: Junsuke Kuroki; Fukashi Sugasawa, both of Yokohama, Japan

[73] Assignee: Nissan Motor Company, Limited, Yokohama, Japan

[21] Appl. No.: 706,279

[22] Filed: Feb. 27, 1985

[30] Foreign Application Priority Data

Feb. 29, 1984 [JP] Japan .................. 59-37984

[51] Int. Cl.⁴ ............................. B60G 17/08
[52] U.S. Cl. .................... 280/707; 180/169; 188/299
[58] Field of Search ........... 280/707, 714; 364/424, 364/425; 188/299, 319; 180/167, 169; 73/105

[56] References Cited

U.S. PATENT DOCUMENTS 4,506,909  3/1985  Nakashima .................. 280/707
4,513,833  4/1985  Sheldon ...................... 188/299

FOREIGN PATENT DOCUMENTS 57-172808 10/1982 Japan .
58-30542   2/1983 Japan .
58-93615   6/1983 Japan .

*Primary Examiner*—John J. Love
*Assistant Examiner*—K.L. Ferriter
*Attorney, Agent, or Firm*—Schwartz, Jeffery, Schwaab, Mack, Blumenthal & Evans

[57] ABSTRACT

A suspension control system for automotive vehicles automatically adjusts the damping strength of variable shock absorbers or other dampers in accordance with road surface conditions. The sensor signal reflects vertical displacement of the vehicle body from the road surface. The sensor signal is compared to a corresponding reference level which is variable depending upon a vehicle speed. The results of comparison give an indication of the degree and scale of irregularities in the road surface. The comparison information is sent to a suspension system controller which causes actuation of the shock or other dampers absorbers to a stiffer mode of operation when road surface roughness requiring harder suspension is recognized.

8 Claims, 18 Drawing Figures

VEHICULAR SUSPENSION CONTROL SYSTEM WITH VARIABLE DAMPING CHARACTERISTICS DEPENDING UPON ROAD CONDITION AND VEHICLE SPEED

BACKGROUND OF THE INVENTION

The present invention relates generally to a control system for a vehicular suspension, such as automotive vehicle suspension, which is variable of the damping characteristics depending upon vehicle driving condition. More particularly, the invention relates to a vehicular suspension control system which varies damping characteristics of the suspension system depending upon a road surface condition and vehicle speed.

Various uses of road preview sensors have been proposed and developed. For example, SAE Technical Paper Series Nos. 630750 and 800520, respectively published on October, 1968 and February, 1980 show road preview sensors for use in suspension systems for obtaining optimum riding comfort and drivability. In addition, Japanese Patent First Publication No. 57-172808, published on Oct. 23, 1982 discloses a vehicle height control system which includes a sensor which detects rough road conditions and adjusts the vehicle height level depending upon road surface conditions. A vehicle height or level sensor is employed in the disclosed vehicle height control system for monitoring the relative displacement between the vehicle body and wheel axle. The output of the vehicle level sensor is compared with a reference level, which serves as a rough road criterion, and adjusts the vehicle height according to the result of judgement of the road surface conditions.

In another example, Japanese Patent First Publication No. 58-30542, published on Feb. 23, 1983, discloses a variable damping force shock absorber with damping characteristics varying in accordance with vehicle driving conditions. In the disclosed system, the magnitude of relative displacement between the vehicle body and wheel axle is measured and a vehicle height variation indicative signal is derived from the measured displacement and the instantaneous vehicle speed. The vehicle height variation indicative signal value is compared with a reference value which serves as a staff suspension criterion for adjustment of the damping characteristics of the shock absorber in accordance therewith.

On the other hand, Published Japanese Patent Application (Tokkai) Sho. 56-42739 discloses a suspension control system which controls the damping force produced in response to rolling forces depending upon vehicle speed and steering adjustments. The damping force is so controlled as to be HIGH when the vehicle speed is higher than a set speed and the steering adjustments through greater than a predetermined angle are performed. In addition, the owner of the present application has already disclosed a suspension control system in Published Japanese Utility Model Application (Jikkai) Sho. 56-147107. In this system, the damping force produced by a suspension shock absorber is adjusted between HIGH and LOW levels depending upon the vehicle speed, the magnitude of steering adjustments and the angular velocity of steering adjustments.

In considering suspension control with respect to roughness of the road surface condition for controlling damping characteristics between HARD and SOFT, HARD/SOFT suspension control criteria would be better to be varied depending upon the vehicle running speed. For instance, as usually experienced, assuming running on the same road over the same uneven, greater magnitude of vibration may be produced as increasing of vehicle speed. Therefore, when the vehicle is running at relatively high speed, harder damping force would be preferred for running over an uneven which may not cause significant instability if the vehicle goes at sufficiently low speed. Alternatively, when harder damping characteristics is selected even in low vehicle speed, rough ride feeling will be given for the passangers to degrade riding comfort. Therefore, in road surface condition dependent suspension control may be required to vary sensitivity of roughness of the road surface depending upon the vehicle speed.

The present invention is intended to provide a suspension control system which is variable of the sensibility of roughness of the road surface depending on the vehicle speed, and thus provide comfortable vehicle suspension with sufficient drivability.

SUMMARY OF THE INVENTION

Therefore, it is an object of the invention to provide a suspension control system which resolves drawbacks in the prior art and can provide both riding comfort and drivability by controlling damping characteristics of the suspension mainly depending upon road surface condition which is recognized by variable sensibility.

A more specific object of the present invention is to provide a suspension control system which includes a sensor capable of monitoring road surface conditions which cause road wheel vibrations, and which selects HARD or SOFT suspension depending upon the roughness of the road surface in terms of a predetermined HARD/SOFT criteria which is variable depending upon a vehicle speed.

In order to accomplish the aforementioned and other objects, a suspension control system, according to the invention, includes a road sensor producing a signal having an amplitude corresponding to the magnitude of the relative displacement between a vehicle body for producing a road roughness indicative signal and a road surface and a vehicle speed sensor monitoring vehicle running speed to produce a vehicle speed indicative signal. Roughness of the road surface is recognized based on the road roughness indicative signal with respect to a predetermined HARD/SOFT suspension criteria. The HARD/SOFT suspension criteria is variable in terms of the vehicle speed indicative signal value. The controller produces a control signal which triggers a variable-damping-characteristics suspension mechanism to adjust the damping characteristics between a HARD suspension mode and a SOFT suspension mode depending upon the road surface conditions.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

The following drawing, throughout which like numerals refer to like elements, may be of assistance in understanding the concepts behind the present invention and the structure, function and purpose of some preferred embodiments thereof:

In the drawings:

FIG. 1 is a perspective view of an automotive vehicle with a typical vehicular suspension system and a first preferred embodiment of a suspension control system in accordance with the present invention;

FIG. 2 shows some examples of magnitude and absorbing characteristics of road shock depending upon a vehicle speed;

FIG. 3 is a block diagram of the suspension control system of FIG. 1;

FIG. 4 is a more detailed block diagram of the road sensor of FIG. 3;

FIG. 5 is a flowchart of an road sensor timing control program executed by the controller of FIGS. 3 and 4;

FIG. 6 is a flowchart of a suspension control program to be executed by the first embodiment of suspension control system according to the invention;

FIG. 7 is a longitudinal section through a shock absorber used in the first preferred embodiment;

FIG. 8 is a longitudinal section of a modified shock absorber which is applicable for the first embodiment of the suspension control system of the invention;

FIG. 9 is a partial longitudinal section through a modified shock absorber;

Figure 13:
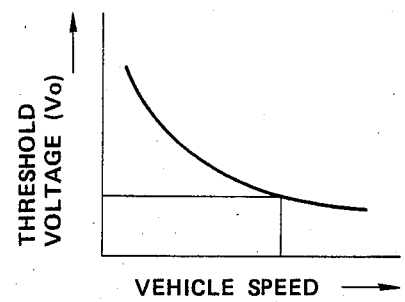
Figure 11:
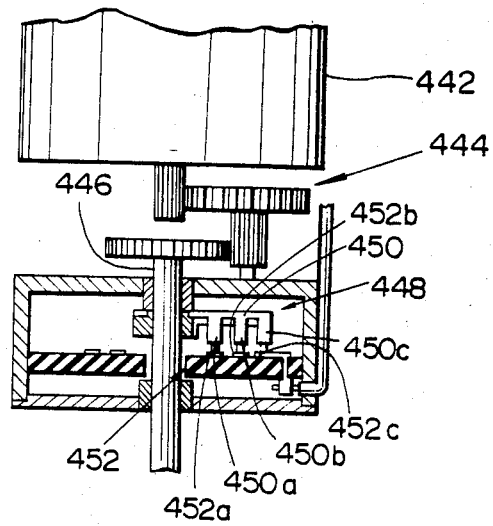
Figure 10A:
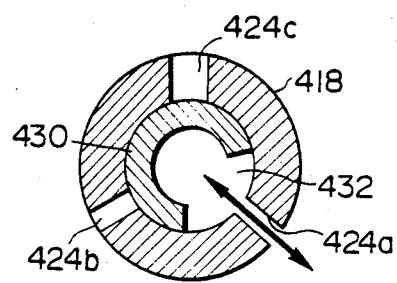
Figure 10B:
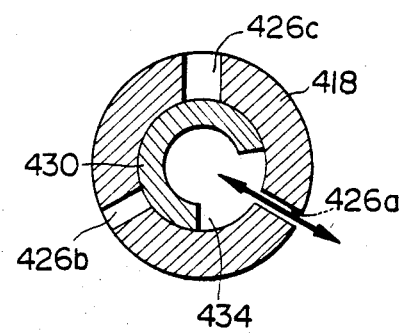
Figure 12:
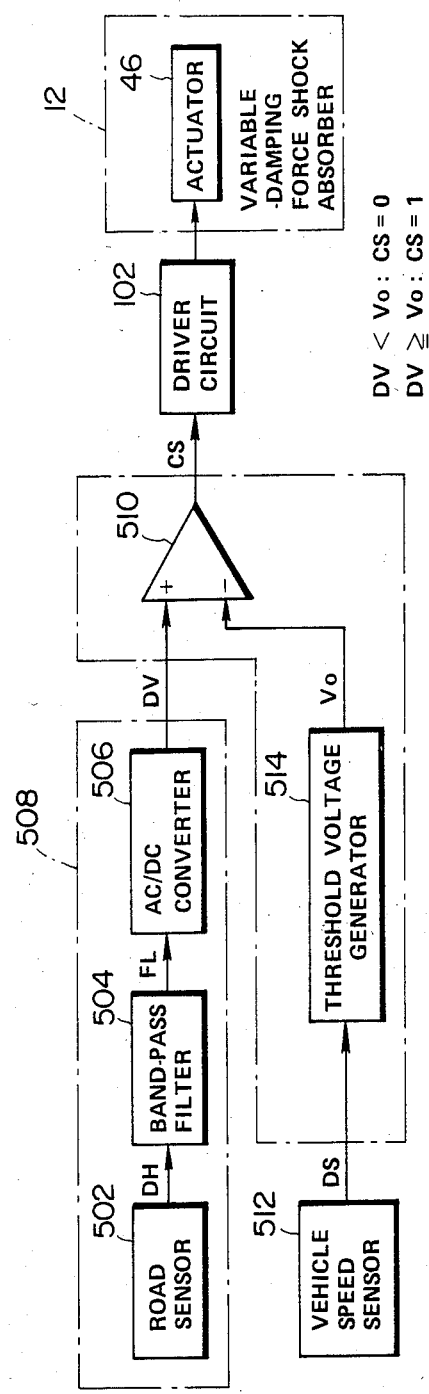
Figure 14:
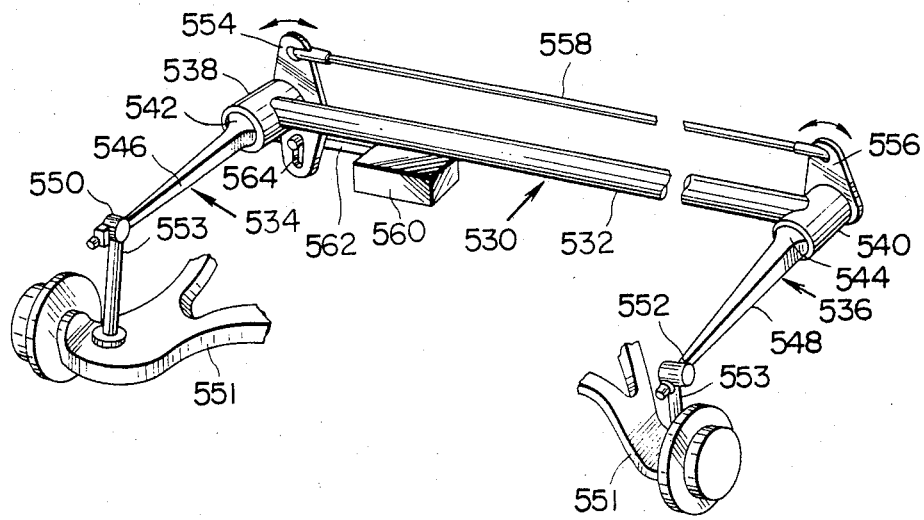
Figure 15:
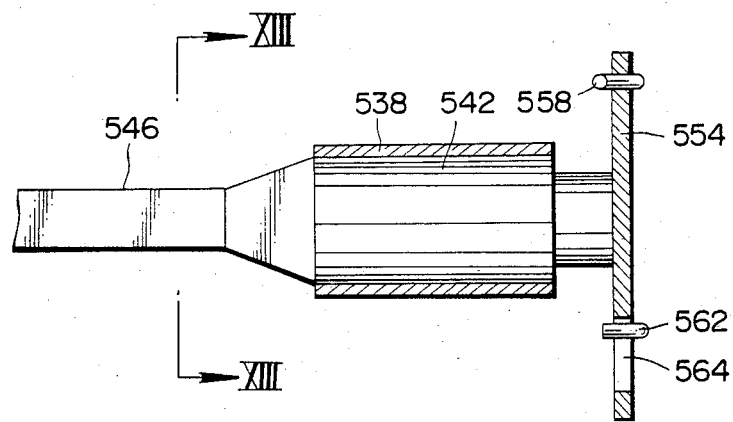
Figure 16:
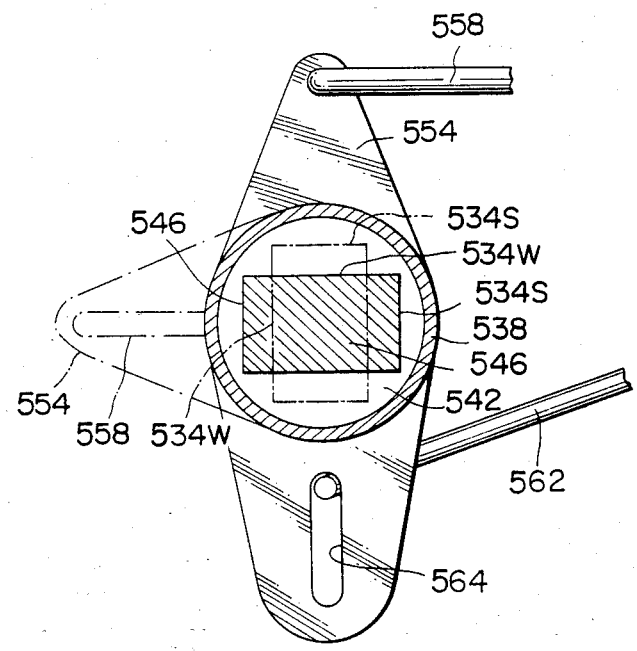

FIGS. 10(A) and 10(B) are enlarged longitudinal sections through the damping force adjusting mechanism of FIG. 11;

FIG. 11 is a cross-section through the mechanism shown in FIG. 12 at positions revealing the three possible fluid flow paths;

FIG. 12 is a block diagram of the second embodiment of a suspension control system in accordance with the present invention;

FIG. 13 shows a graph showing variation of a threshold value representative of HARD/SOFT criteria depending upon a vehicle speed;

FIG. 14 is a fragmentary perspective view of a vehicular roll stabilizer in a suspension system, to which the present invention of a suspension control is applicable;

FIG. 15 is an enlarged side elevation showing major part of the roll stabilizer of FIG. 14;

FIG. 16 is a cross-section taken along line A—A of FIG. 15; and

Figure 17:
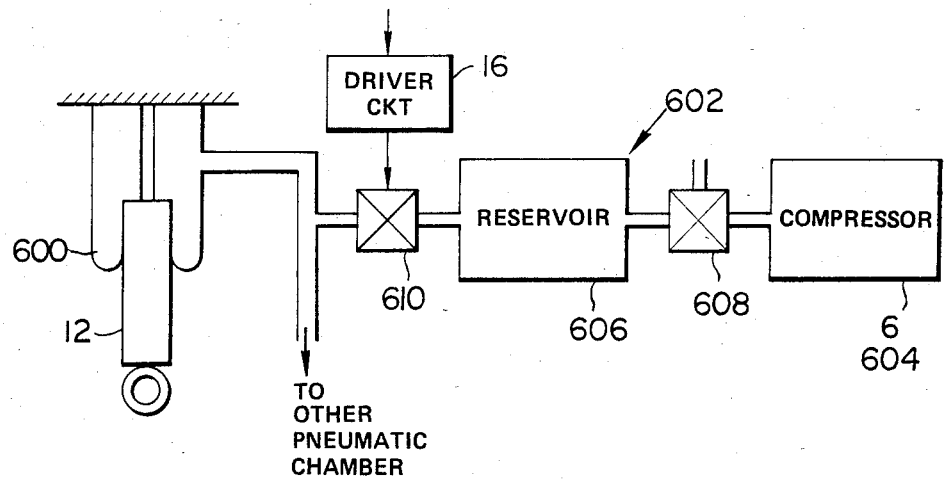

FIG. 17 is a schematic diagram of the third embodiment of a suspension control system in accordance with the present invention.

DESCRIPTION OF THE PREFERRED EMBODIMENTS

Figure 1:
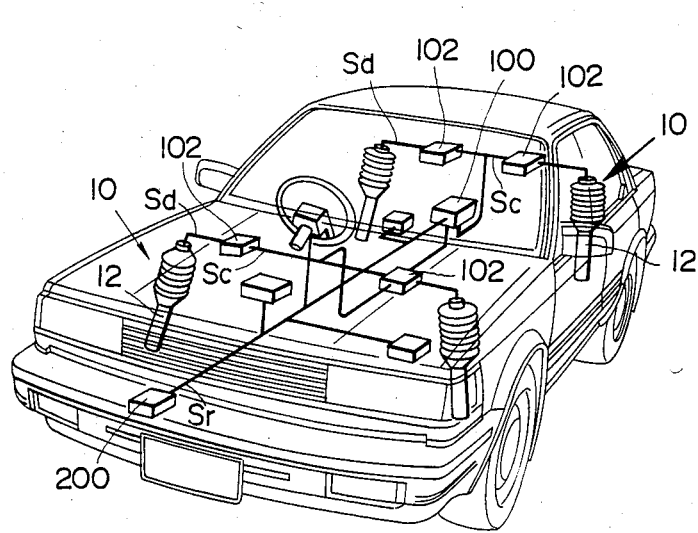

Referring now to the drawings, particularly to FIG. 1, the preferred embodiment of an electronic suspension control system in accordance with the present invention generally comprises suspension strut assemblies 10, each including a shock absorber 12 with variable shock-absorbing characteristics and a controller 100 adapted to produce a control signal for actuating an actuator (not shown in FIG. 1) in each shock absorber 12 in order to the adjust the shock-absorbing characteristics in accordance with the vehicle driving condition.

It should be appreciated that the term "shock-absorbing characteristics" used throughout the disclosure refers to the quantitative degree to which a shock absorber produces damping force or spring force against bounding and rebounding motion of the vehicle body as a sprung mass and the road wheel assembly as unsprung mass, and pitching and rolling movement of the vehicle body relative to the road wheel assembly. In practice, the shock-absorbing characteristics can be controlled in various ways based on flow restriction between shock absorber working chambers disposed in shock absorber cylinders. In the shown embodiment, the flow restriction is variable by means of a flow control valve disposed within a reciprocable piston separating the chambers. The preferred embodiment described herebelow employs a shock absorber with two-way variable shock-absorbing characteristics, i.e. HARD mode and SOFT mode. Obviously, in HARD mode, the damping force generated in response to bounding or rebounding shock applied to the vehicle is greater than in SOFT mode. However, the shown embodiment is to be considered merely as an example for facilitating better understanding of the invention and simplification of the disclosure. In fact, shock absorbers which operate in three modes, i.e. HARD mode, SOFT mode and INTERMEDIATE or MEDIUM mode, are also applicable to the preferred embodiment of the suspension control system according to the invention. Some possible modifications to the shock absorber will be disclosed together with the preferred shock absorber design given later.

Returning to FIG. 1, the controller 100 is connected to a road surface sensor 200 which produces a sensor signal $S_r$ indicative of road surface conditions, which will be referred to hereinafter as "road sensor signal $S_r$". The controller 100 may also be connected to a vehicle speed sensor 201. In practice, the vehicle speed sensor 201 is adapted to monitor rotation speed of a propeller shaft or drive shaft for deriving a vehicle speed indicative signal $S_v$ in a per se well known manner. The controller 100 is also connected to other sensors, such as a brake switch, etc., in order to receive the sensor signals indicative of the suspension control parameters. The controller 100 is, in turn, connected to driver signal generators 102 which are responsive to the control signal from the controller, which control signal $S_c$ can assume either of two states, namely HIGH and LOW. The driver signal generator 102 produces a drive signal $S_d$ which actuates the shock absorber to one of the HARD and SOFT modes.

The controller 100 is responsive to the road sensor signal $S_r$ to produce a control signal $S_c$ for switching the shock absorber between HARD mode and SOFT mode.

Figure 2:
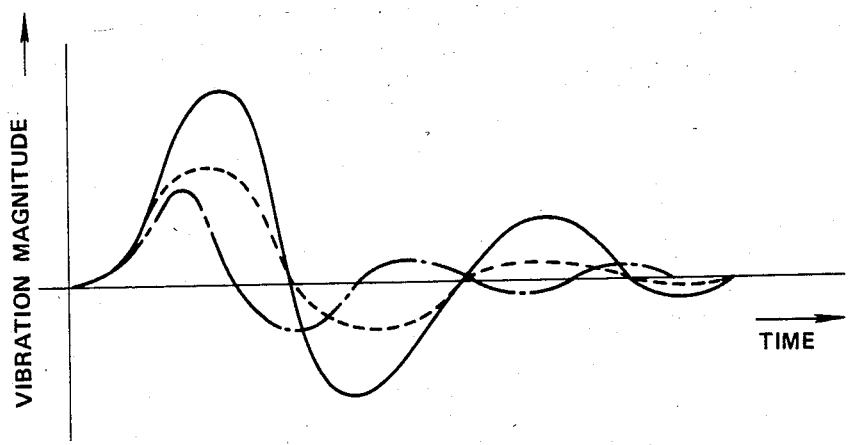

Magnitude of vibration to be caused by impact force applied from road surface through the vehicle wheel is variable depending upon initial amplitude of vibration and speed of vibration. In FIG. 2, a solid line shows vibration caused in relatively high vehicle speed, a broken and a dotted line respectively shows variation of vibration magnitude caused in different vehicle speed lower than the vehicle speed causing the vibration of the solid line. As will be appreciated herefrom, in considering suspension control with respect to roughness of the road surface condition for controlling damping characteristics between HARD and SOFT, HARD/SOFT suspension control criteria would be better to be varied depending upon the vehicle running speed. For instance, as usually experienced, assuming running on the same road over the same uneven, greater magnitude of vibration may be produced as increasing of vehicle speed. Therefore, when the vehicle is running at relatively high speed, harder damping force would be preferred for running over an uneven surface which may not cause significant instability in the vehicle goes at sufficiently low speed. Alternatively, when harder damping characteristics is selected even in low vehicle speed, rough ride feeling will be given for the passangers to degrade riding comfort. Therefore, a road surface condition dependent suspension control may be required to vary sensitivity of roughness of the road surface depending upon the vehicle speed.

Figure 4:
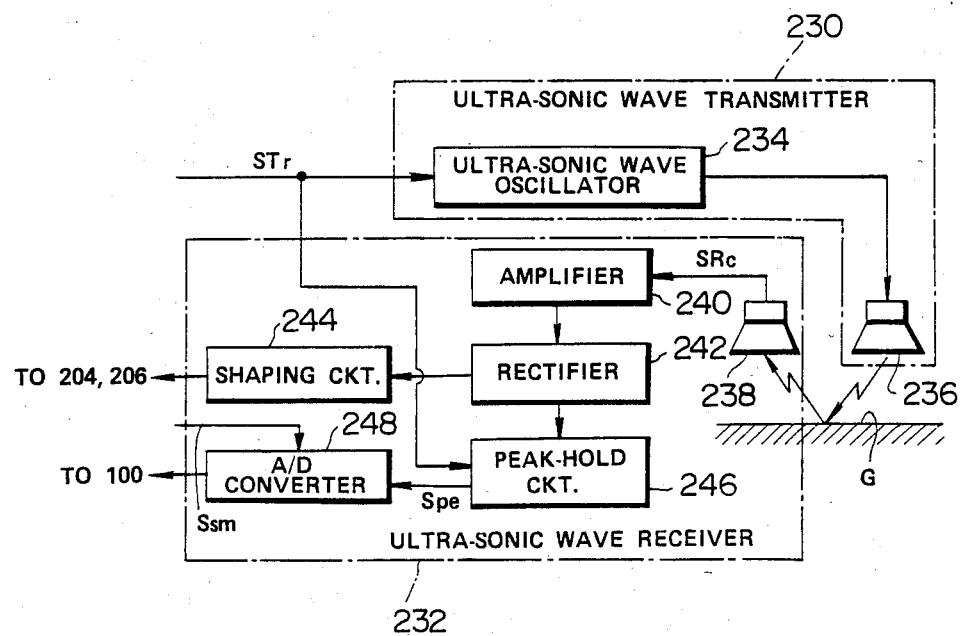

FIG. 4 shows the preferred embodiment of the suspension control system including controller 100 which generally comprises a microprocessor. In practice, the microprocessor performs control operations not only depending upon the road surface conditions but also depending upon vehicle speed, other vehicle driving conditions, such as vehicle acceleration, and other preselected suspension control parameters. One of these suspension control parameters, is the HIGH- or LOW-level output signal from the comparator 214, which switch the damping characteristics of the shock absorber between the HARD and SOFT modes respectively.

The microprocessor 100 generally comprises an input interface 102, CPU 104, RAM 106, ROM 108 and output interface 110. In the shown embodiment, the microprocessor 100 is connected to the road sensor 200 via the input interface 102. The microprocessor 100 is also connected for input from a clock generator 112. RAM 106 includes a memory block 114 serving as a mode-indicative flag $F_{DH}$ which is set while the shock absorber is operating in HARD mode. ROM 108 includes a memory block 116 holding the road surface-dependent suspension control program as an interrupt program triggered by a HIGH-level signal from the comparator 214. The road sensor, in the shown embodiment, comprises an ultra-sonic sensor, construction and operation of which will be described herebelow. The ultra-sonic sensor 200 is associated with the controller 100. ROM 108 has a memory block 118 storing a ultra-sonic sensor control program which triggers the ultra-sonic sensor at a given timing. The output interface 110 of the microprocessor 100 is connected for output of control signal $S_c$ to each of the driver signal generators.

As shown in FIG. 4, the ultra-sonic sensor 202 comprises generally an ultra-sonic wave transmitter 230 and a reflected ultra-sonic wave receiver 232. The transmitter 230 is associated with the controller 100 to receive therefrom a trigger signal $S_{Tr}$ at a given timing. The transmitter 230 includes an ultra-sonic oscillator 234 and an ultra-sonic wave transmitting section 236. The ultra-sonic oscillator 234 is responsive to the trigger signal $S_{Tr}$ from the controller 100, which is issued periodically or intermittently, to transmit or discharge ultra-sonic waves through the transmitter section 236 toward the road surface.

The ultra-sonic waves reflected by the road surface are received by a receiver section 238 of the receiver 232. The receiver section 238 produces a receiver signal $S_{Rc}$ having value varying in accordance with the amplitude of the received ultra-sonic waves. The receiver section 238 is connected to an amplifier 240 to supply the receiver signal $S_{Rc}$ to the latter. The receiver signal $S_{Rc}$ is amplified by the amplifier 240 and transmitted to a rectifier 242. The rectifier 242 is connected to the band-pass filters 204 and 206, through a shaping circuit 244. The rectifier 242 is also connected to a peak-hold circuit 246 which holds the peak value of the receiver signal. The peak-hold circuit 246 produces an analog peak-value-indicative signal $S_{Pe}$ having a value proportional to the held peak value. The peak-hold circuit 246 is connected for output to the controller 100 via an analog-to-digital converter 248. The analog-to-digital converter 248 outputs a binary signal indicative of the peak-value-indicative signal value to the controller 100.

The peak-hold circuit 246 is also connected to the controller 100 to receive the trigger signal $S_{Tr}$. The peak-hold circuit 246 is responsive to the trigger signal from the controller to clear the currently held value.

Figure 5:
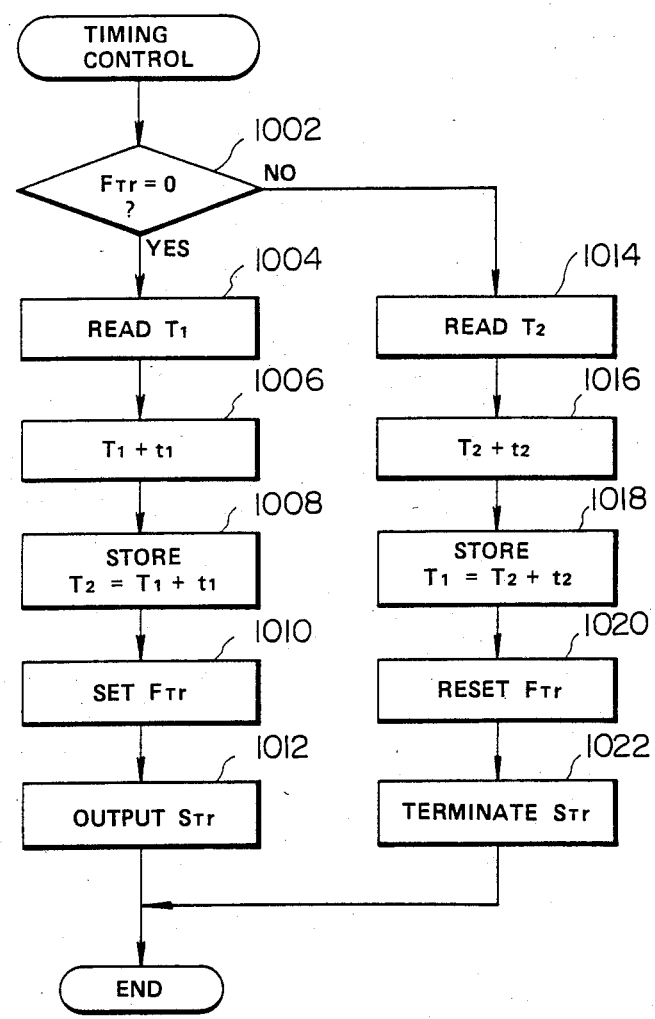

FIG. 5 shows a timing control program executed by the controller 100 for controlling the trigger timing of the ultra-sonic sensor 200.

At the initial stage of execution of the timing control program, a trigger-signal-output-indicative flag $F_{Tr}$ in a memory block 120 of RAM is checked at a step 1002. The trigger signal flag $F_{Tr}$ is set when the trigger signal is output through the output interface 110 to the transmitter 230 and is reset when the trigger signal is not being output.

If the trigger signal-indicative flag $F_{Tr}$ is set when checked at the step 1002, then the timer value $T_1$ of a timer 122 in RAM is latched at a step 1004. The timer 122 continuously counts clock pulses from the clock generator 112. A trigger-signal-ON-time indicative time value $t_1$ is added to the latched timer value $T_1$ at a step 1006. The resultant value $(T_1+t_1)$, which serves as a trigger-signal-OFF time value, is transferred to and stored in a $T_2$-register 124 in RAM 106, at a step 1008. Then the flag $F_{Tr}$ is set at a step 1010. A HIGH-level output is applied to the output interface as trigger signal $S_{Tr}$ at a step 1012.

During the period $t_1$ starting from the time $T_1$, the potential at the output interface is held HIGH to continue application of the trigger signal $S_{Tr}$ to the transmitter 230. The timer 122 continues counting the clock pulses and produces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal-indicative flag $F_{Tr}$ was set at the step 1010 in the previous cycle of program execution, the answer at the step 1002 becomes "NO". Thus, control passes to a step 1014 in which the timer value $T_2$ of the second timer 124 is accessed in RAM 106. Similarly to the first-mentioned timer 122, the timer 124 continuously counts clock pulses from the clock generator 112. An OFF-interval-indicative time data $t_2$ is added to the latched timer value $T_2$ at a step 1016. The time data $t_2$ has a value corresponding to a predetermined interval between successive trigger signals. The resultant time value $(T_2+t_2)$ is stored in the $T_1$-timer 122 of RAM 106 at a step 1018. Then, the flag $F_{Tr}$ is reset at a step 1020. After the step 1020, the output level at the output interface drops to LOW to terminate transmission of the trigger signal to the transmitter, at a step 1022.

The detailed structure and operation of the aforementioned preferred embodiment of the ultra-sonic sensor has been disclosed in the co-pending U.S. patent application Ser. No. 650,705, filed Sept. 14, 1984.

Figure 7:
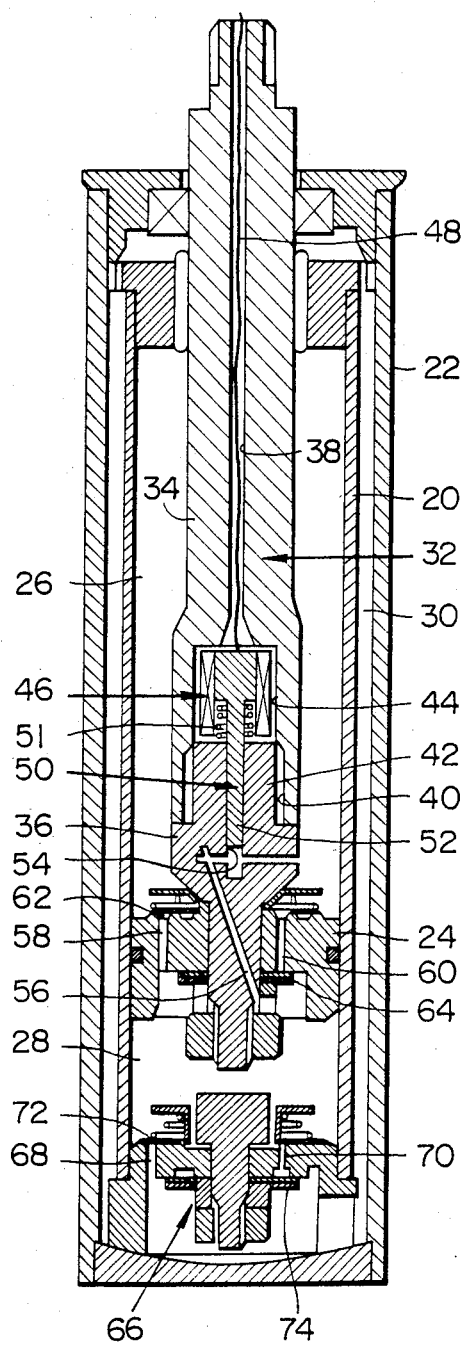
Figure 8:
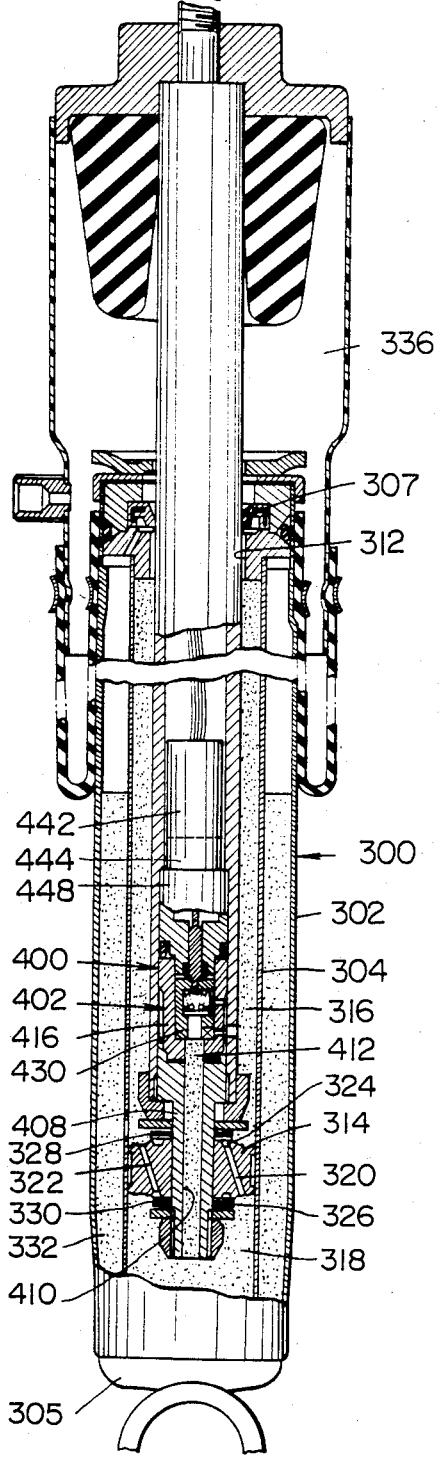

FIG. 7 shows the detailed structure of a variable-damping-force shock absorber 12 employed in the first embodiment of the suspension control system according to the present invention. The shock absorber 12 generally comprises inner and outer hollow cylinders 20 and 22 arranged coaxially, and a piston 24 fitting flush within the hollow interior of the inner cylinder 20. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 comprises upper and lower segments 34 and 36. The upper segment 34 is formed with an axially extending through opening 38. The lower end of the through opening 38 opens into a recess 40 defined on the lower end of the upper segment 34. On the other hand, the lower segment 36 has an upper section 42 engageable to the recess 40 to define therein a hollow space 44. An actuator is disposed within the space 44. The actuator 46 is connected to the driver circuit 16 through a lead 48 extending through the through opening 38. The actuator 46 is associated with a movable valve body 50 which has a lower end extension 52 inserted into a guide opening 54 defined in the lower segment 36. The guide opening 54 extends across a fluid passage 56 defined through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drop in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the fluid passage 56 with the lower end extension 52. As a result, fluid communication between the upper and lower fluid chambers 26 and 28 via the fluid passage 56 is blocked. When fluid communication through the fluid passage is permitted, the damping force produced by the shock absorber 14 remains LOW. On the other hand, when the fluid passage 56 is shut, fluid flow rate is reduced, thus increasing the damping force produced. Therefore, when the valve body 50 is shifted to the lowered position, the shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

In the normal state wherein the control signal of the controller 100 remains LOW, the movable valve body 50 is held in its upper position by the effect of the spring force 51 so that the lower end extension 52 does not project into the fluid passage 56. Therefore, the fluid communication is established through both the fluid passage 56 and the applicable one of the flow-restricting fluid passages 58 and 60. As a result, the total flow restriction is relatively weak to allow the shock absorber to operate in SOFT mode.

In response to a HIGH-level control signal from the controller 100, the driver signal generator 102 corresponding to each shock absorber 12 becomes active to energize the actuator 46. The actuator 46 drives the movable valve body 50 downward. This downward movement shifts the lower end of the extension 52 of the valve body 50 into the fluid passage 56 so as to block fluid communication between the upper and lower fluid chambers 26 and 28 via the fluid passage 56. Therefore, the fluid can flow between the upper and lower chambers 26 and 28 only through one of the fluid passages 58 and 60. The fluid flow restriction is, thus, increased, resulting in a greater damping force than is produced in the SOFT mode. In other words, the shock absorber 12 operates in HARD mode.

Operation of the aforementioned first embodiment of the suspension control system in accordance with the present invention will be described herebelow with reference FIG. 6.

Figure 3:
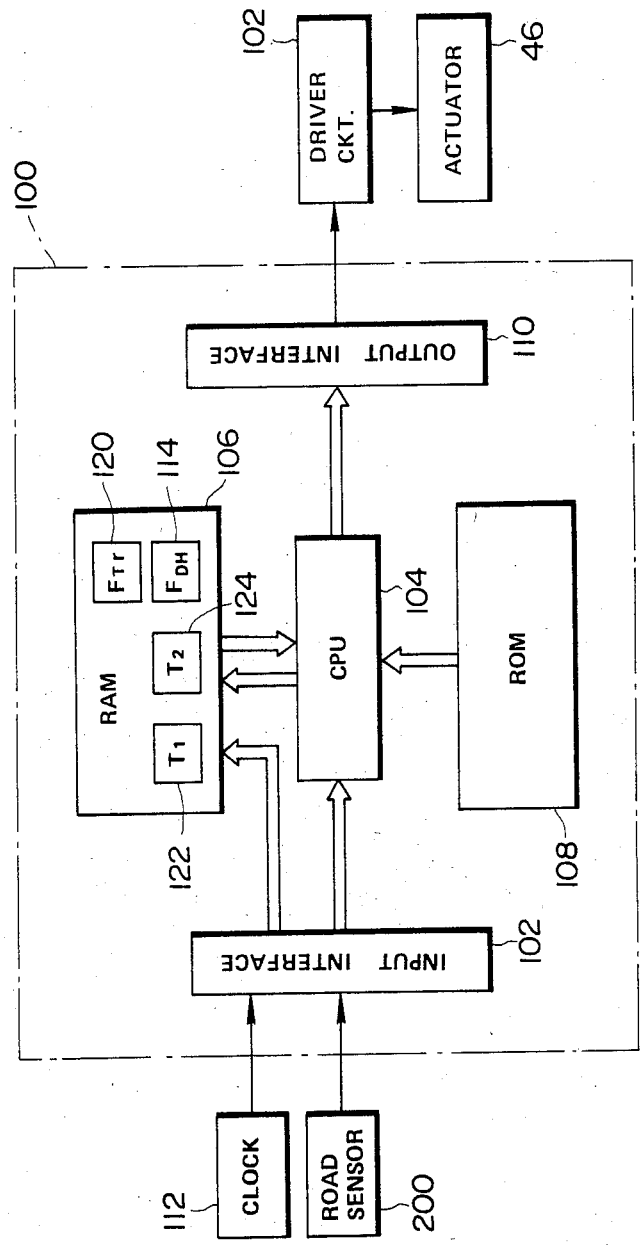
Figure 6:
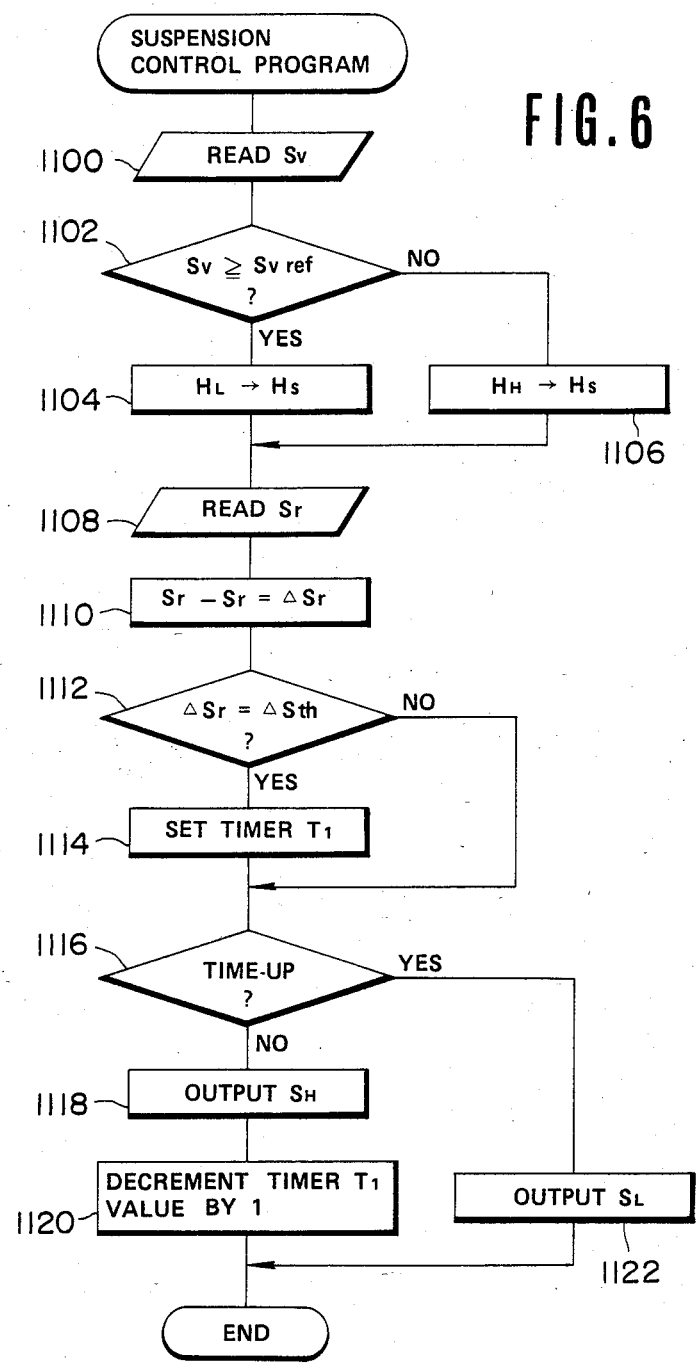

FIG. 6 shows a suspension control program to be cyclically executed at a predetermined timing. Immediately after starting execution of the suspension control program of FIG. 6, the vehicle speed indicative signal value $S_v$ is read out at a block 1100. The read vehicle speed indicative signal value $S_v$ is then compared with a predetermined reference value $S_{vref}$ which is a criteria defining high speed range and low speed range, at a block 1102. When the vehicle speed indicative signal value $S_v$ is equal to or greater than the reference value $S_{vref}$, then a higher threshold value $TH_H$ is set in a block 1104. Alternatively, when the vehicle speed indicative signals value $S_v$ is smaller than the reference value $S_{vref}$ as checked at the block 1102, then a predetermined lower threshold value $TH_L$ is set in a block 1106. The higher and lower threshold values $TH_H$ and $TH_L$ to be set in the blocks 1104 and 1106 would be stored in an appropriate memory block in ROM as shown in FIG. 3.

After processing in the block 1104 or 1106, the road condition indicative signal value $S_r$ is read at a block 1108. On the basis of the read out road condition sensor value $S_r$ which is indicative of the vehicle level H with respect to the road surface. A difference $H_D$ between a preset average vehicle height H and the instantaneous vehicle height H as indicated by the road sensor signal value is derived in a block 1110. The derived difference $H_D$ is compared with the set threshold value $TH_H$ or $TH_L$ in block 1112. It should be appreciated that the preset average vehicle height indicative value H may be also stored in an appropriate memory block in ROM.

When the difference $H_D$ is equal to or greater than the set threshold value $TH_H$ or $TH_L$, the timer 122 in RAM is set at a predetermined value $T_{set}$ at a block 1114. The timer value $T_{set}$ initially set in the block 1114 defines a duration in which the shock absorber operation mode is maintained at HARD or HIGH damping force mode. The timer 122 may be set whenever the difference $H_D$ equal to or greater than the threshold value $TH_H$ or $TH_L$ is detected at the block 1112. At a block 1116, the timer value is checked if it is zero. When the timer value is greater than zero as checked at the block 1116, then the HIGH-level control signal $S_H$ is output at a block 1118 to position the shock absorber at HIGH damping force mode. After outputting the HIGH-level control signal $S_H$, the timer value $T_{set}$ is decremented by 1 at a block 1120.

On the other hand, when the difference $H_D$ is smaller than the set threshold value $TH_H$ or $TH_L$, as checked at the block 1112, then process jumps to the block 1116 to check the timer value $T_{set}$.

When the timer value as checked at the block 1116 is zero, then process goes to a block 1122 to output LOW-level control signal $S_L$ to operate the shock absorber to the LOW damping force mode.

As will be appreciated herefrom, when the vehicle speed is higher than the predetermined reference value, then the lower threshold value is selected for increasing sensibility of the road surface roughness. On the other hand, when the vehicle speed is lower than the reference value, the threshold value is maintained at higher value to maintain the sensibility of the road surface roughness at lower level. On the other hand, in the foregoing control program, by providing the blocks 1114 and 1116, the shock absorber can be maintained at HIGH damping force mode for a predetermined period of time as defined by the initial set time in the timer 122, even after the difference $H_D$ become smaller than the threshold value. This is advantageous to provide better drivability for the vehicle.

Figure 9:
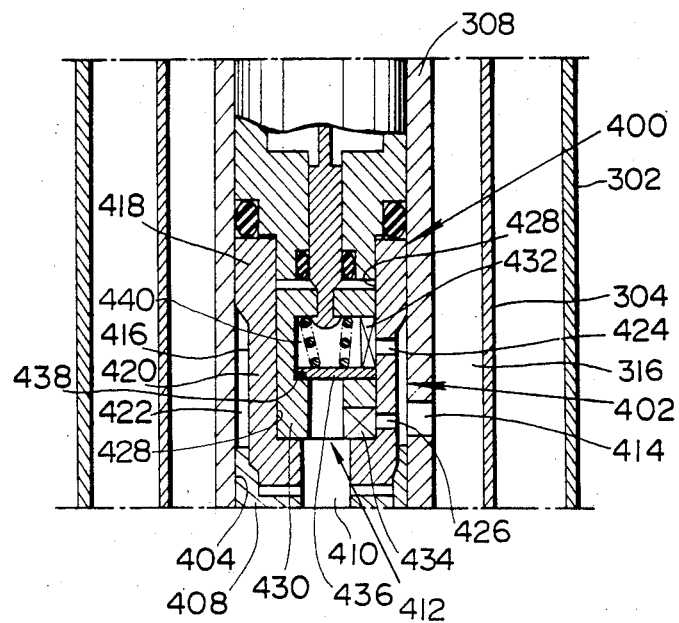

FIGS. 8 to 11 show a modified form of the variable-damping-characteristic shock absorber of FIG. 9. In this modification, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 314 reciprocally housed within the inner cylinder 302 and defining upper and lower fluid chambers 316 and 318 therein.

The piston 314 has fluid passages 320 and 322 connecting the upper and lower fluid chambers 316 and 318. The piston 214 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve, mechanism 402 allows three steps of variation of the damping force, i.e, HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

As shown in FIG. 9, the piston rod 308 defines an axially extending through opening 404 with the lower end opening into the lower fluid chamber 318. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 308 also has one or more radially extending orifices or openings 414 opening into the upper fluid chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

As shown in FIGS. 11(a) and 11(B), the orifices 424 and 426 respectively include first, second and third orifices 424a, 424b, 424c, and 426a, 426b, and 426c. The first orifices 424a and 426a have the narrowest cross-sections and the orifices 432 and 434 are adapted to be in alignment with the first orifices to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c are intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This cause the bound damping force to be somewhat weaker than the rebound damping force.

The rotary valve member 430 is associated with an electrically operable actuator such as an electrical step motor 442 through a differential gear unit 444 and an output shaft 446 as shown in FIG. 11. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to a controller 100 to receive the control signal as a mode selector signal which drive the motor 442 through an angle corresponding to the rotary valve movement of the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 8, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIG. 10. FIGS. 10(A) and 10(B) show the case of the HARD mode. In this case, the orifice 432 of the rotary valve 430 is in alignment with the orifice 424a and the orifice 434 is in alignment with the orifice 426a. During vehicle rebounding motion, i.e., in the piston compression stroke, the fluid flows from the upper fluid chamber 316 to the lower fluid chamber 318 through the orifice 426a. On the other hand, during vehicle bounding motion, the fluid flows from the lower fluid chamber 318 to the upper fluid chamber 316 through orifices 424a and 426a. Since the first orifices 424a and 426a are the narrowest, the damping force produced in this mode is the highest among the three selectable modes.

In case of the MEDIUM mode, the orifices 432 and 434 of the rotary valve member 430 are respectively in alignment with the second orifices 424b and 426b.

In the case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 16. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 16 is responsive to the control signal to drive the step motor 442 to operate the rotary valve member 430 to the corresponding valve position.

As an alternative in the modification set forth above, only SOFT and MEDIUM modes may be used for road-condition-dependent suspension control. Therefore, when the HARD mode is selected in the foregoing first embodiment set forth above the controller 100 actuates the shock absorber to MEDIUM mode.

FIG. 12 shows the second embodiment of the suspension control system according to the present invention. In this embodiment, a road sensor 502 is connected to a band-pass filter 504 which is a low-pass filter to pass low frequency component of the road sensor signal DH. The output FL of the band-pass filter 504 thus includes relatively low-frequency component representative of vehicle body vibration. The band-pass filter output FL is fed to an AC/DC converter 506 which comprises a rectifier and a smoothing circuit. The output DV of the AC/DC converter 506 is input to noninverting input terminal of a comparator 510.

The road sensor 502, the band-pass-filter 504 and the AC/DC converter 506 forms a road surface condition indicative signal generator 508.

The inverting input terminal of the comparator is connected to a threshold voltage generator 514 which is adapted to produce a reference signal Vo indicative of a threshold value to be compared with the road surface condition indicative signal value as the output DV of the AC/DC converter. The reference signal generator 514 is, in turn, connected to a vehicle speed sensor 512 adapted to produce a vehicle speed indicative signal DS.

The comparator 510 compares the road surface condition indicative value of the AC/DC converter output DV with the threshold value of the reference signal Vo to produce HIGH level comparator signal CS when the road surface condition indicative value is greater than the threshold value. The comparator signal CS is fed to the driver circuit 102 to operate the actuator 46 of the variable damping force shock absorber to operate the latter to the HARD or HIGH-damping characteristics.

As shown in FIG. 13, the threshold value of the reference signal to be produced is variable depending upon the vehicle running speed as indicated by the vehicle speed indicative signal. As will be appreciated herefrom, the threshold value is reduced according to increasing of the vehicle speed in non-linear fashion.

FIGS. 14 to 16 show the structure of a roll stabilizer 530 to be controller by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearing sections 538 and 540 at both ends.

The parallel bar sections 534 and 536 have end segments 542 and 544 of circular cross-section adapted to rotatably engage the bearings 538 and 540 of the transverse bar section 532. The parallel bar sections 534 and 536 have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearing portions 538 and 540. Link plates 554 and 556 are rigidly fitted onto the protruding ends of the parallel bar sections 534 and 536. The link plates 554 and 556 are rotatable about the bearing sections 538 and 540 together with the parallel bar sections 534 and 536. The link plates are connected to each other through a linkage 558. In addition, the link plates 554 is associated with an actuator 560 through an actuation rod 562 engaging an elongated opening 564 of the link plate 554. The actuator 560 may comprise an electromagnetically operative solenoid. The actuator is adapted to be energized by a control signal fed from a controller 100 to rotate the link plate 554 along with the parallel bar section 534 through 90° from the shown neutral position. When the actuator 560 is energized, the link plate 556 is also rotated according to rotation of the link plate 554 to pivot the parallel bar 536 through 90° within the bearing section 540.

As shown in FIG. 16, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position, the bending stress on the parallel bar sections 534 and 536 is increased, i.e., the torsion on the transverse bar section 532 of the stabilizer is increased.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the road surface condition indicative signal value remains less than the threshold value which is also derived in accordance with the vehicle speed.

When the steering angle change matches or exceeds the threshold value, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

FIG. 17 shows another arrangement of the automotive suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure control valve 610. The pressure control valve 610 connected to the driver circuit 16 to be controlled thereby. In the induction mode, the fluid reservoir 606 is connected to the compressor 604 to receive the pressurized fluid. On the other hand, the fluid reservoir 606 is open to atmopshere to decrease the fluid pressure in the ventilation mode of the induction valve.

The pressure control valve 610 is co-operative with the induction valve 608 to adjust the fluid pressure in the pneumatic chamber 600 in accordance with vehicle driving conditions.

According to the shown embodiment, the driver circuit 16 may be connected to the control system of any of the first embodiment so that it is activated in response to road roughness. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the rough road which causes relatively low-frequency of vibration on the vehicle body as detected by the manner as set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the penumatic chamber are weakened.

The above-mentioned suspension system structure of FIG. 17 has been disclosed in U.S. Pat. No. 4,349,077 to Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European patent application No. 84100729.7, filed on Jan. 24, 1984. The contents of the above-identified U.S. patents are hereby incorporated by reference.

Road surface condition dependent suspension control can also be achieved with this suspension system. When road roughness requires harder suspension, the pressure control valve 610 is closed to block fluid communication between the pneumatic chamber 600 and the reservoir in order to increase the stiffness of the strut assembly and so produce a greater damping force with which to suppress vibration of he vehicle body. On the other hand, on relatively smooth road surface conditions, the pressure control valve 610 remains open, allowing fluid communication between the pneumatic chamber and the reservoir chamber. As a result, sufficiently soft shock-absorbing characteristics can be provided to ensure good riding comfort.

As set forth above, according to the present invention, the vehicular suspension system can provide both riding comfort and good drivability by controlling hardness of the suspension depending upon the road surface conditions.

It should be noted that although the shown embodiments control the damping force and/or rigidity of the suspension system by adjusting the damping characteristics of the suspension strut assemblies, it would also be possible to perform suspension control by adjusting the rigidity of a roll-stabilizer employed in the vehicle suspension. Such variable spring-force or damping-force stabilizers for vehicle suspension systems have been illustrated in the co-pending U.S. patent application Ser. No. 647,648, filed Sept. 6, 1984.

What is claimed is:

1. A suspension control system for an automotive vehicle comprising:
   - a damper means interpositioned between a vehicle body and a road wheel for absorbing, at least in part, relative displacement between the vehicle body and the road wheel, said damper means having damper characteristics selectably variable between a first weaker damping characteristics mode and a second stronger damping characteristics mode;
   - a first sensor producing a first sensor signal, the amplitude and frequency of which correspond to the amplitude and frequency of vibrations of the vehicle body;
   - a second sensor adapted to produce a second sensor signal indicative of a vehicle speed;
   - a filter means receiving said first sensor signal and outputting a filter signal representative of the amplitude of a specific frequency range of said sensor signal;
   - a comparator means receiving said filter signal and comparing the amplitude thereof with a reference value, said comparator means producing a comparator signal when the filter signal value is greater than the reference value;
   - a reference signal generator for transmitting said reference signal to said comparator means, said reference signal generator being responsive to said second sensor signal to vary the value of said reference signal based thereon;
   - a controller associated with said damper means for normally operating the latter in said first softer damping characteristics mode, said controller being responsive to said comparator signal to operate said damper means in said second harder damping characteristics mode.

2. The suspension control system as set forth in claim 1, wherein said first sensor is an ultra-sonic sensor transmitting ultra-sonic waves towards a road surface, receiving ultra-sonic waves reflected by the road surface and producing said sensor signal representative of the interval between transmission and reception of ultra-sonic waves.

3. The suspension control system as set forth in claim 2, wherein said damper means comprises a hydraulic shock absorber including a reciprocating piston disposed within a shock absorber housing, said piston having a valve means which can be operated by a control signal from said controller to adjust the resistance to flow of working fluid in said cylinder therethrough.

4. The suspension control system as set forth in claim 3, wherein said controller receives said comparator signal and derives the control signal level in accordance therewith.

5. The suspension control system as set forth in claim 1, wherein said damper means comprises a roll stabilizer extending perpendicular to the longitudinal axis of the vehicle and producing a damping force against vibration applied to said vehicle body, said stabilizer including a means for adjusting the torsion modulus of the stabilizer in order to adjust the damping force to be produced, and an actuator associated with said torsion modulus adjusting means for operating said means to adjust the torsion modulus of the stablizer.

6. The suspension system as set forth in claim 5, wherein said actuator operates in an on/off manner and said control signal supplied to said actuator by said controller is a binary signal so that in response to a high-level control signal, the torsion modulus is adjusted to a first higher level, and in response to a low-level control signal, the torsion modulus is adjusted to a second lower level.

7. The suspension system as set forth in claim 6, wherein said stabilizer comprises a pair of longitudinally extending segments of essentially rectangular cross section and a transverse bar section, each of said extending segments having a first end rotably connected to a suspension arm, and a second end connected to an end of said second end connected to an end of said transverse bar and associated with said actuator, said actuator causing rotational movement of the axially extending segments through 90° so as to adjust the torsion modulus of the stabilizer.

8. The suspension system as set forth in claim 7, wherein said actuator is operative between a first position in which the torsion modulus of the stabilizer is at a first, higher value, and a second position in which the torsion modulus of the stabilizer is at a second, lower value.

* * * * *